US011275723B2

(12) United States Patent
Cazin

(10) Patent No.: US 11,275,723 B2
(45) Date of Patent: Mar. 15, 2022

(54) REDUCING PROCESSING FOR COMPARING LARGE METADATA SETS

(71) Applicant: Microsoft Technology Licensing, LLC, Redmond, WA (US)

(72) Inventor: Victor Cazin, Paris (FR)

(73) Assignee: Microsoft Technology Licensing, LLC, Redmond, WA (US)

(*) Notice: Subject to any disclaimer, the term of this patent is extended or adjusted under 35 U.S.C. 154(b) by 361 days.

(21) Appl. No.: 16/239,597

(22) Filed: Jan. 4, 2019

(65) Prior Publication Data

US 2019/0205294 A1    Jul. 4, 2019

Related U.S. Application Data

(63) Continuation of application No. 15/281,171, filed on Sep. 30, 2016, now abandoned.

(51) Int. Cl.
| | | |
|---|---|---|
| *G06F 7/00* | (2006.01) | |
| *G06F 16/23* | (2019.01) | |
| *G06F 16/25* | (2019.01) | |
| *G06F 16/22* | (2019.01) | |
| *G06F 16/2455* | (2019.01) | |
| *G06F 16/27* | (2019.01) | |

(52) U.S. Cl.
CPC ...... *G06F 16/2365* (2019.01); *G06F 16/2282* (2019.01); *G06F 16/2455* (2019.01); *G06F 16/2456* (2019.01); *G06F 16/258* (2019.01); *G06F 16/273* (2019.01)

(58) Field of Classification Search
CPC .. G06F 16/2365; G06F 16/213; G06F 16/215; G06F 16/24558; G06F 16/24528; G06F 16/24534; G06F 16/24535; G06F 16/284
See application file for complete search history.

(56) References Cited

U.S. PATENT DOCUMENTS

| | | | |
|---|---|---|---|
| 6,003,025 | A | 12/1999 | Prager |
| 6,003,039 | A | 12/1999 | Barry et al. |
| 6,044,205 | A | 3/2000 | Reed et al. |

(Continued)

FOREIGN PATENT DOCUMENTS

| | | | |
|---|---|---|---|
| WO | 2005106712 A1 | | 11/2005 |
| WO | WO2005/106712 A1 | * | 11/2005 |

OTHER PUBLICATIONS

Hernandez et al., "The Merge/Purge Problem for Large Databases", ACM. 1995.*

(Continued)

*Primary Examiner* — Daniel A Kuddus
(74) *Attorney, Agent, or Firm* — Alleman Hall Creasman & Tuttle LLP

(57) ABSTRACT

A computer system compares databases, where each data record includes values for a plurality of fields, by applying database operations on database tables of the data records to reduce computations being performed. For each data record in a reference set, candidate matches are identified from among the data records in a target set by performing a join operation on the sets on one or more selected, normalized fields from the sets. This significantly reduced set of candidate matches can be further analyzed to determine how similar they are to the data record from the reference set.

16 Claims, 10 Drawing Sheets

(56) References Cited

U.S. PATENT DOCUMENTS

| | | | |
|---|---|---|---|
| 6,044,374 | A | 3/2000 | Nesamoney et al. |
| 6,088,717 | A | 7/2000 | Reed et al. |
| 6,092,080 | A | 7/2000 | Gustman |
| 6,112,527 | A | 9/2000 | Steinmeyer et al. |
| 6,209,003 | B1 | 3/2001 | Mattis et al. |
| 6,216,130 | B1 | 4/2001 | Hougaard et al. |
| 6,226,637 | B1 | 5/2001 | Carey et al. |
| 6,263,337 | B1 * | 7/2001 | Fayyad ............... G06K 9/6223 |
| 6,477,269 | B1 | 11/2002 | Brechner |
| 7,251,648 | B2 * | 7/2007 | Chaudhuri ........ G06F 16/24578 |
| | | | 707/749 |
| 7,296,011 | B2 * | 11/2007 | Chaudhuri ............ G06F 16/215 |
| 7,546,288 | B2 | 6/2009 | Springer, Jr. et al. |
| 7,693,887 | B2 | 4/2010 | McLaughlin |
| 7,844,119 | B2 | 11/2010 | Rising |
| 7,885,436 | B2 | 2/2011 | Russo et al. |
| 8,046,339 | B2 * | 10/2011 | Chaudhuri ........ G06F 16/24558 |
| | | | 707/692 |
| 8,095,515 | B2 * | 1/2012 | Sereni ................. G06F 16/2425 |
| | | | 707/688 |
| 8,266,115 | B1 | 9/2012 | Park et al. |
| 8,280,861 | B1 | 10/2012 | Park et al. |
| 8,335,801 | B2 | 12/2012 | Gardner et al. |
| 8,495,075 | B2 | 7/2013 | Miller |
| 8,555,317 | B2 | 10/2013 | Cho et al. |
| 9,122,683 | B1 | 9/2015 | Azarm et al. |
| 9,275,311 | B2 | 3/2016 | Lavi et al. |
| 9,280,577 | B1 | 3/2016 | Hines |
| 2003/0023975 | A1 * | 1/2003 | Schrader ............ H04N 5/44543 |
| | | | 725/51 |
| 2004/0260694 | A1 * | 12/2004 | Chaudhuri .......... G06F 16/2468 |
| 2006/0212429 | A1 * | 9/2006 | Bruno ............... G06F 16/24542 |
| 2009/0240649 | A1 * | 9/2009 | Sereni ................. G06F 16/2425 |
| | | | 706/54 |
| 2011/0185381 | A1 | 7/2011 | Wang et al. |
| 2012/0158743 | A1 * | 6/2012 | Gardner ................. G06F 16/48 |
| | | | 707/748 |
| 2013/0124525 | A1 * | 5/2013 | Anderson ............. G06F 16/278 |
| | | | 707/737 |
| 2013/0325888 | A1 | 12/2013 | Oneppo et al. |
| 2014/0286624 | A1 | 9/2014 | Eronen et al. |
| 2014/0358916 | A1 * | 12/2014 | Anand ................ G06F 16/9038 |
| | | | 707/732 |
| 2015/0071552 | A1 * | 3/2015 | Lavi ...................... G06F 16/532 |
| | | | 382/201 |
| 2015/0095349 | A1 * | 4/2015 | Sturzoiu ........... G06F 16/24578 |
| | | | 707/748 |
| 2015/0110340 | A1 | 4/2015 | Harran et al. |
| 2016/0179883 | A1 * | 6/2016 | Chen .................... G06F 16/211 |
| | | | 707/714 |

OTHER PUBLICATIONS

"Notice of Allowance Issued in U.S. Appl. No. 15/281,171", dated Oct. 5, 2018, 17 Pages.

Chandar, Jairam, "Join Algorithms Using Map/Reduce", Master of Science Thesis, School of Informatics, University of Edinburgh, 2010, 66 Pages.

Yeh, et al., "Fast Visual Retrieval Using Accelerated Sequence Matching", In Journal of IEEE Transactions on Multimedia, vol. 13, Issue 2, Apr. 2011, pp. 320-329.

* cited by examiner

REDUCING PROCESSING FOR COMPARING LARGE METADATA SETS

CROSS-REFERENCE TO RELATED APPLICATIONS

This application is a continuation application of U.S. patent application Ser. No. 15/281,171, entitled "REDUCING PROCESSING FOR COMPARING LARGE METADATA SETS", filed on Sep. 30, 2016, pending, which is hereby incorporated by reference.

BACKGROUND

A common problem with large databases is comparing contents of one database to contents of another database to determine an extent of overlap between the two databases. For example, a first database of items for sale by a store can be compared to a second database of items for sale by another store to determine which items are available in both stores, or which items are available in only one of the stores. As another example, a first database of media items available in a first repository can be compared to a second database of media items in another repository to determine whether equivalent items are available in both repositories, or to identify items which are available in only one of the repositories and not the other. Given information about which items are believed to be the same in two databases, information about those items also can be compared. For example, given databases of media files, after similar items are identified, information stored in the two databases about those items can be compared, such as prices, user ratings, file size, date of upload and so on.

Identifying similar items in databases can be performed readily if globally unique identifiers for the items are available in the databases; the items with equal identifiers are the same. If such globally unique identifiers are not available, then metadata for each item can used to determine if items are the same. Such metadata for an item typically includes multiple fields of data, with each field storing a value that partially describes the item. Sets of metadata from two databases can be compared to determine whether items are the same.

Comparison of metadata sets, such as for comparing two databases of items, can be computationally intensive when the databases are large. In particular, if one database has a first number N of items, and a second database has a first number M of items, the number of comparisons of items to be performed is the product of the first and second numbers (N×M). Computation of a similarity metric based on multiple data fields across a large number of items in large databases consumes significant computing resources. Where each item is represented by yet a third number X of fields of metadata, the number of potential comparison operations is the product of the first, second and third numbers (i.e., N×M×X). Thus, for large data sets in some applications, comparison of metadata sets can be computationally expensive.

The complexity of comparing databases is further increased when metadata is unstructured text, incomplete, inaccurate or includes multiple variations. For example, some metadata fields may include several words of text. Some metadata fields may be missing values. Some metadata fields may have different, but equivalent, values in different data sets. For example, a text field may have a first set of words for one item in a database, and the text field of a corresponding item in another database may have a second set of words that is different from the first set of words, but the sets of words may have the same meaning. For example, the words may be different words in the same language which have the same meaning, or words in different languages. Some fields of the metadata may be incorrect. For example, a date field may have incorrect data, or a text field may have a misspelled word. With such data, metadata sets cannot be compared based on an exact match or numerical similarity metrics.

In addition, with some kinds of databases, a result desired from the comparison may be identifying, for each item in one database, not a single item in another database that exactly matches, but instead multiple items in the other database that may be similar. For example, when comparing databases of movie titles, the result of the comparison could be to identify multiple versions of each movie. If multiple similar items are the desired result, a simple exact match type of comparison cannot be used.

SUMMARY

This Summary is provided to introduce a selection of concepts in a simplified form that are further described below in the Detailed Description. This Summary is intended neither to identify key or essential features, nor to limit the scope, of the claimed subject matter.

A computer system compares databases, where each data record includes values for a plurality of fields, by applying database operations on database tables of normalized data from the databases to reduce computations being performed. For each data record in a reference set (a first database), candidate matches are identified from among the data records in a target set (a second database) by performing a join operation on the sets on one or more selected, normalized fields from the sets. The effect of the join operation is to compute a reduced list of candidate data records from the second database for each data record in the first database. This significantly reduced set of candidate matches can be further analyzed to determine how similar they are to the data record from the reference set.

In particular, a field in each database is identified as an index field. The computer system normalizes the index field and performs a join operation of the databases on the normalized index field to generate a table. The table resulting from the join operation includes, for each data record in the first database having a similar data record in the second database, and for each similar data record, a row combining data fields for the data record from the first database with data fields for the similar data record from the second database. A similar data record is identified as a data record that has a value in the normalized second index field which is equal to the value in the normalized first index field for the data record in the first database. The effect of the join operation is to compute a reduced list of candidate data records from the second database for each data record in the first database, and to associate the data from each candidate data record in the second database with the data from the corresponding data record in the first database into a single record. These candidate data records can then be further analyzed.

Multiple metadata fields are used in this further analysis to compare a data record from the first database to each of its candidate data records from the second database. For example, for each row in the generated table, for each pair of a first metadata field and corresponding second metadata field, the computer system compares the value of the first metadata field to the value of the corresponding second metadata field to generate a score for the pair of corresponding metadata fields. The computer system can store the scores computed for multiple pairs of corresponding metadata fields as data fields in the row.

The computer system can include a matching module for each type of metadata field. For example, the matching module can determine how to compute a score for a pair of values of a particular type of data. Different matching modules can be provided for different types of data, such as dates, titles, names, descriptive text, and so on. Matching modules can compute a score using a function that has a parameter that allows the strictness of the matching to be adjusted or tuned.

For each row in the generated table, the computer system determines, based on the generated scores stored in the row, whether the data record from the second database corresponding to the row is sufficiently similar to the data record from the first database corresponding to the row. In this computation, as an example, data records may be identified as sufficiently similar if they are different versions of the same item. Further processing of the identified data records can be performed to determine whether the data records represent the same item or different versions of an item.

In the following description, reference is made to the accompanying drawings which form a part hereof, and in which are shown, by way of illustration, specific example implementations. Other implementations may be made without departing from the scope of the disclosure.

DETAILED DESCRIPTION

Figure 1:
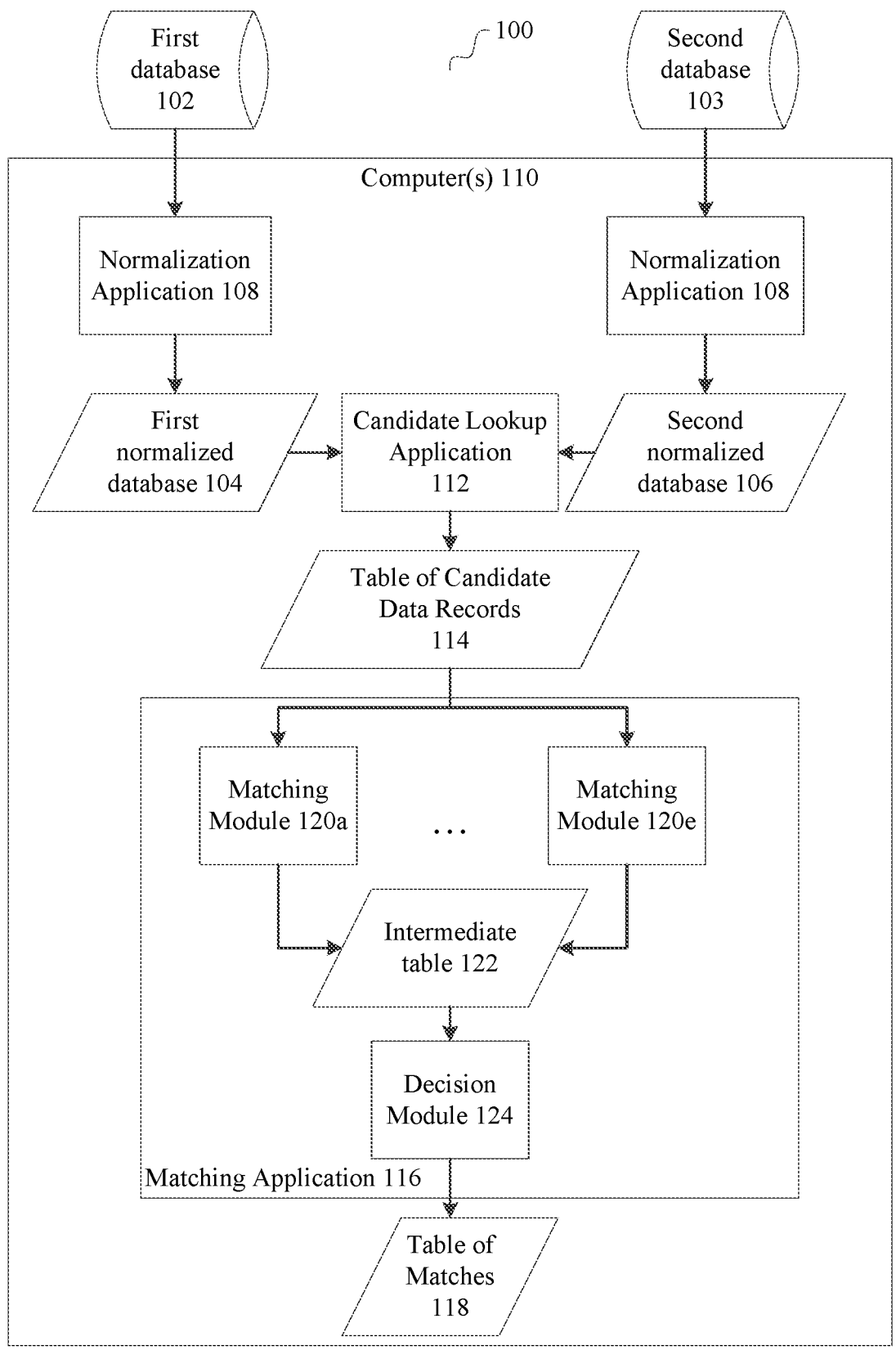
FIG. 1 is a combined block diagram and data flow diagram of an example computer system configured to compare databases.

FIG. 1 is a block diagram of an example computer system 100 configured to support comparison of contents of two databases. This example computer system 100 includes a first database 102 and a second database 103. An example implementation of the databases is described in more detail below in connection with FIG. 3. Generally speaking, the first database comprises a first plurality of first data records, and the second database comprises a second plurality of second data records. The term "data record" as used herein means any data structure used to store data describing an item in the database.

The computer system 100 also includes one or more computers 110. A computer 110 includes a normalization application 108 that extracts and normalizes data from the first and second databases and stores the normalized data in first and second normalized databases 104 and 106. An example implementation of such a normalization application, with processes for normalizing data of different data types, is described in more detail below in connection with FIGS. 4 and 7. The normalized databases 104 and 106 can be stored as relational database tables in a relational database management system on the computer 110.

The computer 110 further includes a candidate lookup application 112 that, for each data record in the first normalized database, identifies any data records in the second normalized database that are candidates for further analysis. More particularly, given an identification of normalized index fields in the data records of the first and second normalized databases, a join operation is performed on the normalized index fields. The candidate lookup application 112 has a first input through which it receives data from the first normalized database 104 and a second input through which it receives data from the second normalized database 106. The candidate lookup application 112 has an output through which it provides a table 114 of candidate data records resulting from the join operation.

Figure 5:
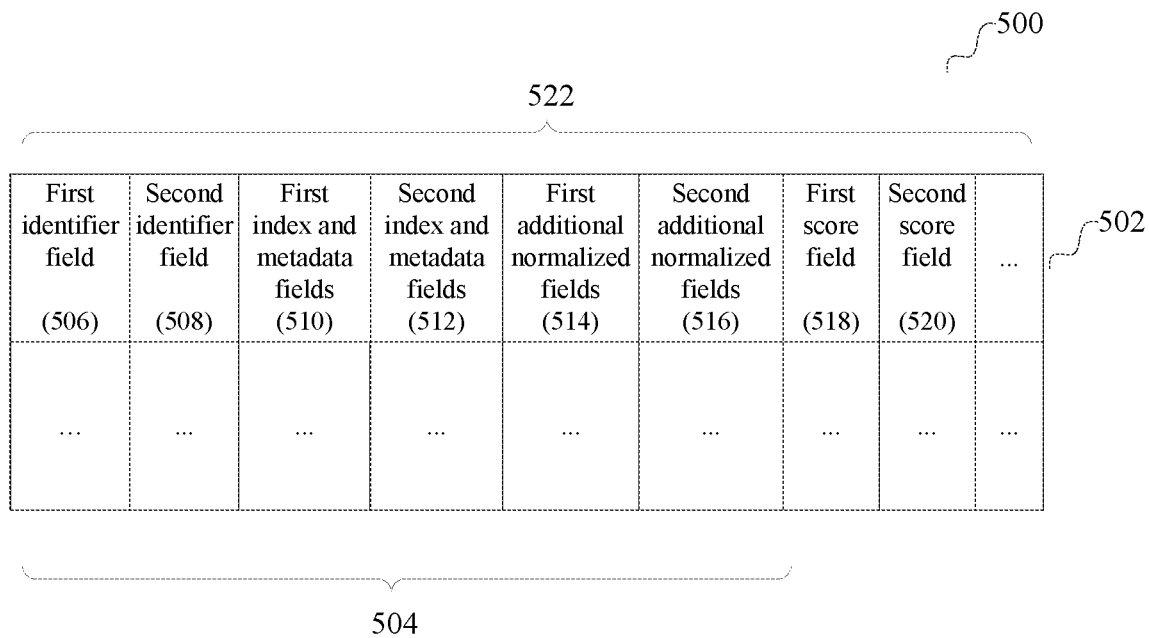
FIG. 5 is a diagram of an illustrative example of a table of data records resulting from a join, and such a table with scores generated by the matching modules.
Figure 8:
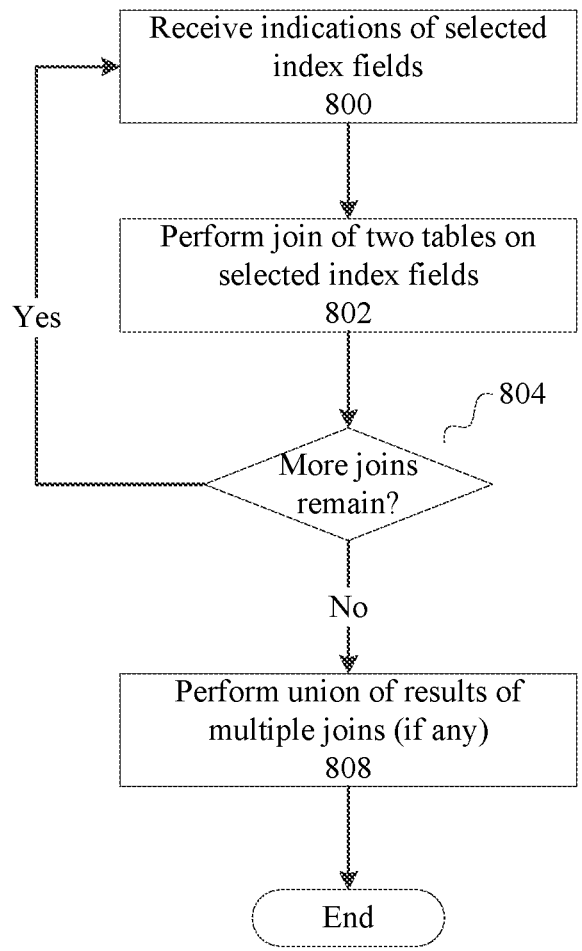
FIG. 8 is a flow chart describing an example implementation of a candidate lookup application.

The join operation of the normalized databases on the normalized index fields generates the table 114 of candidate data records. More particularly, the table resulting from the join operation includes, for each data record in the first database having a similar data record in the second database, and for each similar data record, a row combining data fields for the data record from the first database with data fields for the similar data record from the second database. A similar data record is identified as a data record that has a value in the normalized second index field which is equal to the value in the normalized first index field for the data record in the first database. The effect of the join operation is to compute a reduced list of candidate data records from the second database for each data record in the first database, and to associate the data from each candidate data record in the second database with the data from the corresponding data record in the first database into a single record. These candidate data record associations can then be further analyzed. FIGS. 5 and 8 below are provided to describe an example implementation of the candidate lookup operation in more detail.

The computer 110 further includes a matching application 116 that, for each candidate data record in the table 114, determines whether the data record from the first and second databases represented by the candidate data record are sufficiently similar to be identified as a match. The matching application 116 has an input through which it receives data from the table 114 and an output through which it provides a table 118, including an indication for each candidate data record whether that candidate data record represents a match. An example implementation of this table is described below in connection with FIGS. 5 and 6.

For example, for each row in the generated table, for each pair of a first metadata field and corresponding second metadata field, the matching application 116 compares the value of the first metadata field to the value of the corresponding second metadata field to generate a score for the pair of corresponding metadata fields. The matching application 116 stores the scores computed for multiple pairs of corresponding metadata fields as data fields added to the row from table 114, thus providing the updated table 118.

The matching application 116 can include, as an example implementation, a matching module 120 (labeled as 120a, . . . , 120e in FIG. 1) for each type of data in the candidate data record. For example, each matching module can determine how to compute a score for a pair of values of a particular type of data. Different matching modules can be provided for different types of data, such as dates, titles, names, descriptive text, and so on. Matching modules can compute a score using a function that has a parameter that allows the strictness of the matching to be adjusted or tuned. These scores can be stored in an intermediate table 122, an example implementation of which is described in FIGS. 5 and 6. Example implementation of such a matching application is described in more detail below in connection with FIG. 9.

The matching application 116 can include, as an example implementation, a decision module 124, which determines, for each row in the generated table and based on the generated scores stored in the row, whether the data record from the second database corresponding to the row is sufficiently similar to the data record from the first database corresponding to the row. In this computation, as an example, the decision module can identify data records as sufficiently similar if they are different versions of the same item. The decision module can further process the identified data records to determine whether a data record represents the same item or a different version of an item. Such a determination can be reflected as a value in a data field of each candidate data record in the output table 118. An example implementation of a decision module is described in more detail below in connection with FIG. 10.

The computer 110 can be implemented using a general purpose computer such as described below in connection with FIG. 11. The computer system can include a plurality of such computers 110. For example, different computers can be used to execute the different applications or modules in FIG. 1, or different computers can be used to process different parts of the data, such as different parts of the table 114 of candidate data records. In particular, by implementing the applications on the computer 110 using database operations such as join operations, multiple computers can be used to process data in a distributed system. In particular, and for example, join operations of the candidate lookup application can be highly parallelized. The other applications also can be executed on multiple computers with partial data sets for more efficiency. Thus, in practice, the applications 108, 112, 116, are executed on multiple computers at the same time.

Figure 2:
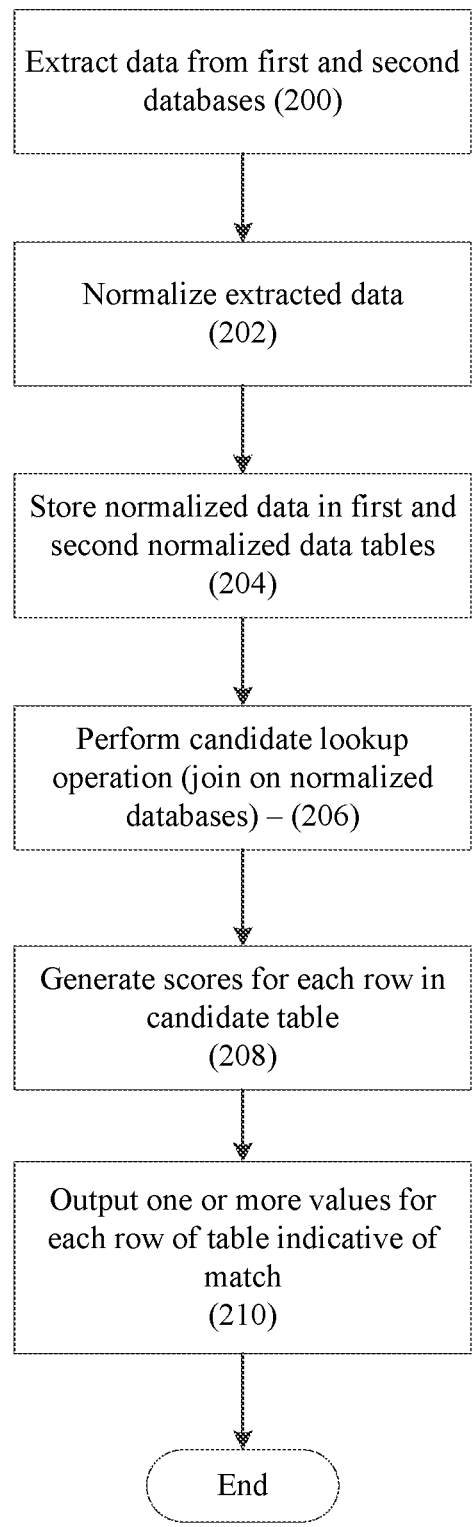
FIG. 2 is a flow chart illustrating an example of operation of the computer system of FIG. 1.

Referring now to FIG. 2, a flowchart describing operation of the computer system 100 will now be described. The computer 110 extracts (200) data records from the first database 102 and second database 103. The extraction of data records from the first and second databases can be performed in several ways, depending on how the computer 110 has access to the first database 102 and to the second database 103. For example, such extraction can be performed by transmission of one or more queries or read requests from the computer over a computer network to a remote computer to request data from the first or second database where the first or second database is stored on a remote computer. Alternatively, the computer may periodically receive data from a remote computer. The computer may read data from a data file, containing the first or second database, local to the computer. The extracted data may be normalized and stored in a data file or database, in memory or in persistent storage such as in a data file. The extracted data can be a set of data fields which is a smaller subset of the data fields in the first database or the second database.

The normalization application 108 normalizes (202) the extracted data and stores (204) the normalized data in first and second normalized databases 104 and 106. The normalization process can include creating multiple normalized data fields from a single original data field.

The candidate lookup application performs (206) a join operation on the first and second normalized databases on a selected index field to generate the table 114 of candidate data records. More than one field can be selected as an index field, and multiple join operations can be performed, with the resulting tables 114 combined together. In such an implementation, the combined table can include a field indicating which index fields matched for the candidate records.

The matching application 116 generates (208) scores for each row of the table 114 of candidate data records. The matching application outputs (210) one or more values for each row of the table 114 indicating whether the candidate data records are considered a match based on the generated scores. In some implementations, such as one described in more detail below in, the matching application can decide for each row, using the scores generated for the row, whether the candidate is a match to the reference and can keep only matches for additional processing. The additional processing can include a version similarity computation, which computes a distance between the product version of the reference and the product version of the candidate. This similarity metric, among multiple matches for a given reference, can be used in selection of the best or n-best matches with the given reference.

Figure 3:
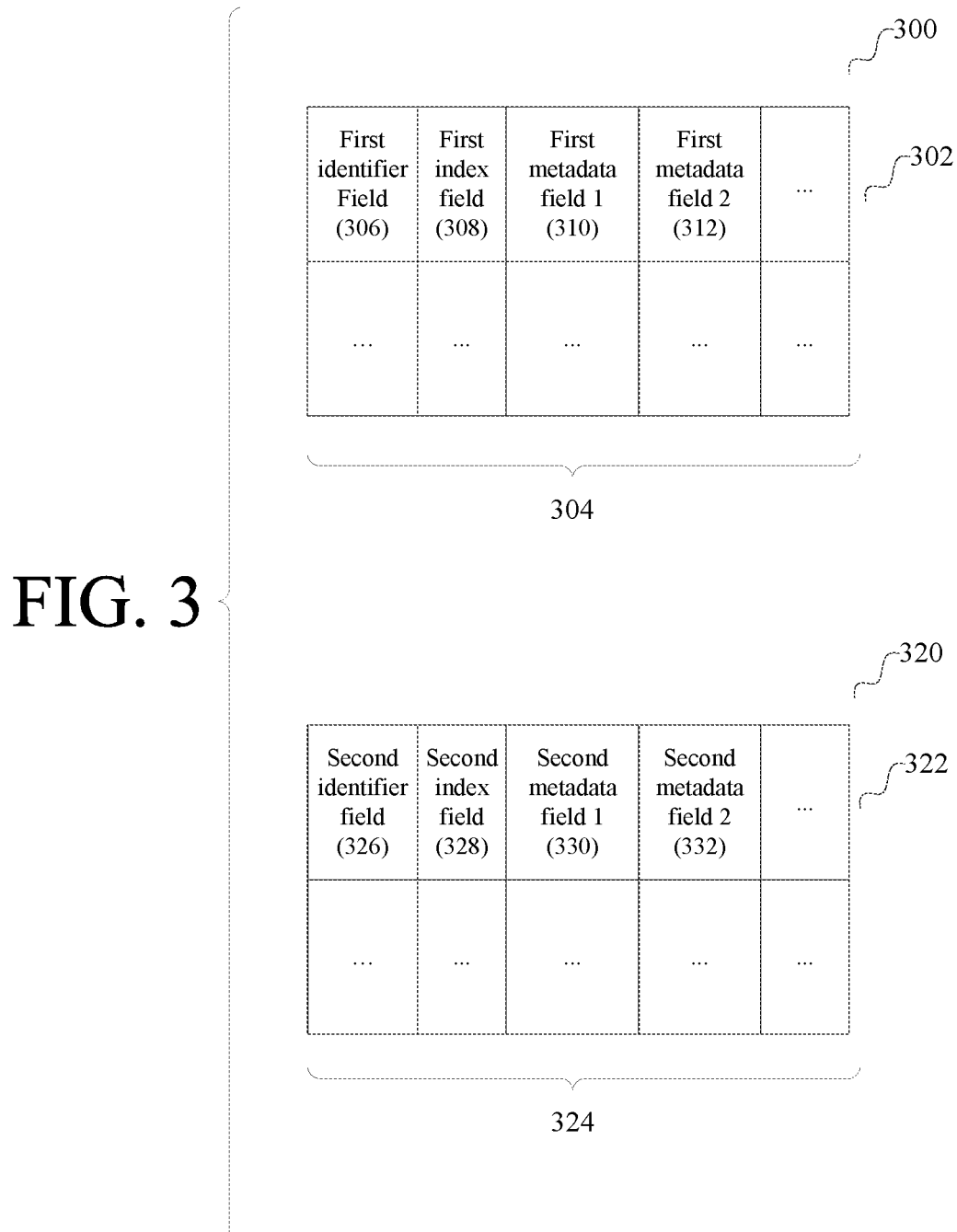
FIG. 3 is a diagram of an illustrative example of a first database and a second database.
Figure 4:
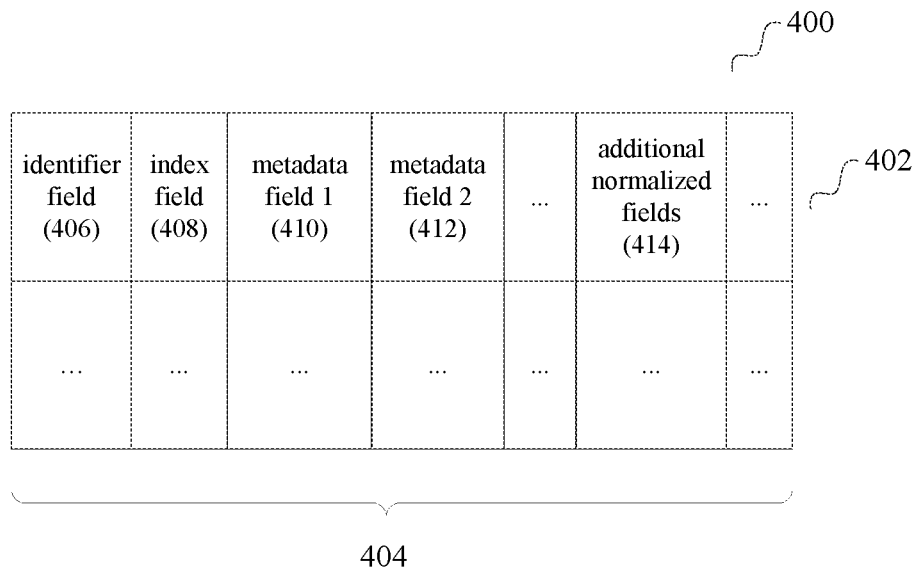
FIG. 4 is a diagram of an illustrative example of a table of extracted and normalized data.
Figure 6:
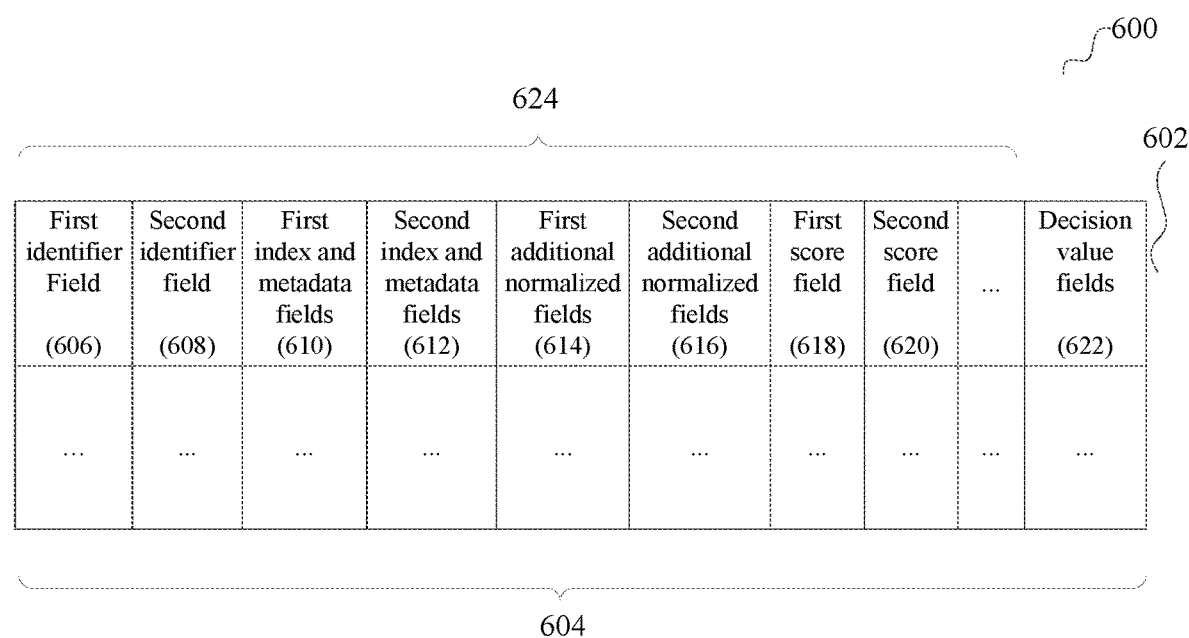
FIG. 6 is diagram of an illustrative example of a table of data records with scores generated by the matching modules, and such a table with final scores generated by the decision module.

Referring now to FIGS. 3 to 6, example database tables will now be described. FIG. 3 illustrates an example database for a first database and a second database. FIG. 4 illustrates an example database table for storing data extracted from the first database or from the second database, and for storing the first and second normalized databases. FIG. 5 illustrates an example database table for the table of candidate data records resulting from a join operation, and such a table combined with scores from matching modules as an intermediate table. FIG. 6 illustrates an example database table for an intermediate table including scores from matching modules, and an output table that includes computed scores and values indicating whether a record represents a match.

In FIG. 3, a first database 300 comprises a first plurality of first data records 302. Each first data record comprises a first plurality of first data fields 304 storing metadata describing an item from among a first plurality of items. The first plurality of data fields comprises at least a first identifier field 306, a first index field 308, and at least two more first metadata fields 310, 312. The first database may store metadata in many more than two metadata fields. Also, these metadata fields may be distributed among many different data records in the first database, and likely not in a single table.

Each first identifier field 306 for each first data record for an item stores a value representing an identifier for the item in the first database. This identifier typically is unique for the item within the first database. Each first index field 308 for each first data record for an item is a metadata field that stores a value representing a description of the item. This first index field is identified prior to the extraction process as the field on which the join operation will be performed after normalization of the data in the field. The field that is selected as the index field depends on the implementation and the nature of the databases being compared. In general the index field is a field which, after normalization of values in both databases, has a high likelihood of having values from both databases that are an exact match if the items are similar. The metadata field used as a first index field for this comparison may not be marked as such a field in the first database.

Similarly, a second database 320 comprises a second plurality of second data records 322. Each second data record comprises a second plurality of second data fields 324 storing metadata describing an item from among a second plurality of items. The second plurality of data fields comprises at least a second identifier field 326, a second index field 328, and at least two more second metadata fields 330, 332. The second database may store data in many more than two metadata fields. The second database may store metadata in many more than two metadata fields. Also, these metadata fields may be distributed among many different data records in the second database, and likely not in a single table. The structure of the second database, and the kinds of metadata fields it stores, can be substantially different from the first database. However, it should have at least two metadata fields, e.g., 328, 330, 332, in which the stored data is similar in type to at least two other metadata fields, e.g., 308, 310, 312, in the first database.

Each second identifier field 326 for each second data record for an item stores a value representing an identifier for the item in the second database. This identifier typically is unique for the item within the second database. For similar items in the first database and the second database, the value stored as the identifier for the similar item in the first identifier field is assumed to be different from the value stored as the identifier for the similar item in the second identifier field. Thus the values in the identifier fields can be ignored in the comparison of the databases. The identifier is useful for retrieving or otherwise accessing data about an item from the database.

Each second index field 328 for each second data record for an item is a metadata field that stores a value representing a description of the item. This second index field is identified prior to the extraction process as the field on which the join operation will be performed after normalization of the data in the field, and at is selected because it has data similar to the data found in the corresponding first index field 308. The metadata field used as a second index field for this comparison may not be marked as such a field in the second database.

It is assumed, in the comparison operation described herein, that values stored in the metadata fields in either the first database or the second database may store unstructured text, may be incomplete, may be inaccurate or may be imprecise. For example, some metadata fields may be missing values. Some values in the metadata fields may be incorrect. Corresponding metadata fields from different data records for the same item may have different, but similar, values.

Additionally, in the case where the database represents a catalog of items representing media data files, the catalog may have multiple versions of a work, such as multiple versions of a movie. For example, for a given movie, there may be a theatrical release, a director's cut, a version reformatted for television, a sequel, a dubbed version in a different language from the original language, and so on. Using the techniques described below, such versions can still be identified as similar works even if they are not identical. It is assumed that the media data files themselves are not being accessed to perform a comparison of the media data.

Turning now to FIG. 4, an example database table for storing data extracted from the first database or from the second database, and for storing the first and second normalized databases, will now be described.

Similar to the first database 300 and the second database 320, normalized data extracted from one of these databases can be stored in a table 400 comprising a plurality of data records 402. Each data record comprises a plurality of data fields 404 storing metadata describing an item from among a plurality of items. The plurality of data fields comprises at least an identifier field 406, an index field 408, and at least two more metadata fields 410, 412. However, unlike the first and second database 300 and 320, where the various data fields may be distributed among various structures in the database, in table 400, the extracted identifier field, index field and metadata fields for an item are combined in a single row for the item. Queries on the first database and the second database can be used to populate such a table 400. A first such table 400 is created using data extracted from the first database 300; a second such table 400 is created using data extracted from the second database 320. The data in table 400 is normalized as described below. Additional fields 414 can be stored in the normalized data table for normalized values so as to provide a table with both original values as read from one of the database, and the corresponding normalized values. The normalization process may convert an original field into multiple normalized fields as well.

Given a normalized table of data extracted from the first database and a normalized table of data extracted from the second database, the objective is to identify, for each data record in a reference set, e.g. from the first database, candidate matches from among the data records in a target set, e.g., the second database. This objective can be accomplished by performing a join operation on two tables 400 on one or more selected normalized fields 414 from the sets. This significantly reduced set of candidate matches can be further analyzed to determine how similar they are to the data record from the reference set. The result of the join operation is a table of candidate records, an example implementation of which will now be described in connection with FIG. 5.

This table 500 resulting from the join operation includes, for each data record in the first database having a similar data record in the second database, and for each similar data record, a row 502 combining data fields for the data record from the first database with data fields for the similar data record from the second database.

A similar data record is identified as a data record that has a value in the normalized second index field which is equal to the value in the normalized first index field for the data record in the first database. The join operation in effect performs this identification. More particularly, an inner join operation is performed. Further, the effect of the join operation is to compute a reduced list of candidate data records from the second database for each data record in the first database, and to associate the data from each candidate data record in the second database with the data from the corresponding data record in the first database into a single record. These candidate data record associations can then be further analyzed.

Thus, a row 502 in the table of candidate data records 114 includes a plurality of fields 504 including the first identifier field 506 for the data record from the first database and the second identifier field 508 for the data record from the second database. The row further includes the first index field and first metadata fields 510, and second index field and second metadata fields 512. Further first additional normalized fields 514 and second additional normalized fields 516 from the normalized data tables 400 for the first and second database also are added.

If more than one field has been selected as an index field, and multiple join operations have been performed, the resulting tables are combined together. In such an implementation, the combined table can include, for each row, a field (not shown) indicating which index fields matched for the candidate data records.

Given the table of candidate data records such as shown in FIG. 5, for each row in the generated table, for each pair of a first metadata field and corresponding second metadata field, the matching application compares the value of the first metadata field to the value of the corresponding second metadata field to generate a score for the pair of corresponding metadata fields. It should be understood that a comparison for a pair of corresponding metadata fields can use data from a plurality of first metadata fields and a plurality of second metadata fields to generate a score. The computer system can store the scores computed for multiple pairs of corresponding metadata fields for a candidate data record as data fields in the row as indicated at 518, 520. A table with such scores has rows of fields 522, and can implement the intermediate table 122 of FIG. 1.

FIG. 6 illustrates an example database table 600 for an intermediate table with fields 624, which includes scores computed for each candidate, or for an output table with fields 604 which further includes computed final decision values indicating whether a record represents a match. The intermediate table and the output table can incorporate the candidate table 500 and add fields to that table. Thus, each row 602 includes a plurality of fields 604, including the first identifier field 606, second identifier field 608, first index and metadata fields 610, second index and metadata fields 612, first additional normalized fields 614 and second additional normalized fields 616. In addition, each row includes a first score 618 based on a first pair of metadata fields, and a second score 620 based on a second pair of metadata fields, and so on for multiple pairs of corresponding metadata fields. In the final output table, these scores can be processed to generate one or more decision values 622. In the example described below, there are three such decision values.

More details of an example implementation of such a computer system and its operation will be described below in connection with FIGS. 7-10.

Normalization of the metadata fields in the first and second databases is dependent on the type of the data stored in the databases. Generally, normalization is performed to allow data to be compared. For example, if dates are stored in different formats in the different databases, date data can be transformed from an original format in the first or second database into the same format in the normalized data tables.

Text information can be normalized, in part, using techniques to be applied generically to all text data. Such techniques generally can be implemented in the form of rules which specify an input text string and its corresponding output text string. An order of application of such rules also can be specified. In other words, if the input text string is identified in an original data field, the output text string replaces that data in the normalized data field. Such example rules which can be generically applied are the following:
  a. replace capital letters with lower case letters;
  b. convert any word representing a number into the number, e.g., "two" becomes "2";
  c. remove words, e.g., "the", based on a specified list, which may be language specific;
  d. remove any character that is not a number or a letter.

As an example application of such rules, consider the string "Iron Man: three". According to rule a, this becomes "iron man: three". Rule b further transforms this to "iron man: 3". Rule c is inapplicable, and rule d further transforms the string to "ironman3".

Text information can be further normalized based on information known about the purpose of the metadata field containing the text information. For example, in a database of media files such as movies or music, there may be fields that include proper names, such as a director, actor, musician or the like. Such a data field may include more than one name, or a name may be missing. Such name fields can be normalized by first identifying each name in the field, normalizing each name according to the normalization rules, e.g., "Jane Doe" becomes "janedoe", and then concatenating the normalized names together. The concatenation can be performed using a predetermined ordering, such as alphabetical ordering, and a predetermined delimiter between each name, such as a special character such as "&".

As another example, in a database of media files such as movies or music, a data field is typically present for storing text data for a title. Before generic normalization is applied, the text in the title field can be extracted into multiple data fields, each of which can be separately normalized using the generic rules. Text data for a title typically can include a main title, other data indicative of a version, such as a subtitle and a year. Subtitles can be extracted by identifying typical delimiters in text that signify a subtitle, and extracting text after or between such delimiters. Examples of such delimiters are parentheses or a colon. A year can be extracted by identifying, for example, a sequence of four concatenated numerals. Using such rules, an original title field "Batman (2015 Remaster)" can be transformed into three data fields: a title field "Batman", a subtitle field "Remaster", and a year field "2015", which can be further normalized.

As another example, as a special case of a proper name, in a database of media files such as movies or music a studio name or other corporate source of the media file may be one of the metadata fields. Such data might be in the form of "Copyright 1993 XYZ Studios". Such a field can be normalized by extracting a name and/or a year, and applying normalization rules to the extracted data. In the case of the studio name, one additional normalization step can be to replace the name with a substitute name given a predetermined list of synonyms. Such synonyms can be based on information about corporate acquisitions, for example.

A range of such normalization rules can be provided for each data type and each metadata field. Normalization rules also can be language specific, and can be specified applied in a language-dependent order. As an example, English-specific rules can be applied first, and then French-specific rules can be applied next. Such normalization helps to transform unstructured text, incomplete, inaccurate or otherwise variable data into a format that can be more easily compared. Normalization rules can be defined based on the data type of each metadata field, allowing the system to be tailored to the data sets actually being compared.

Figure 7:
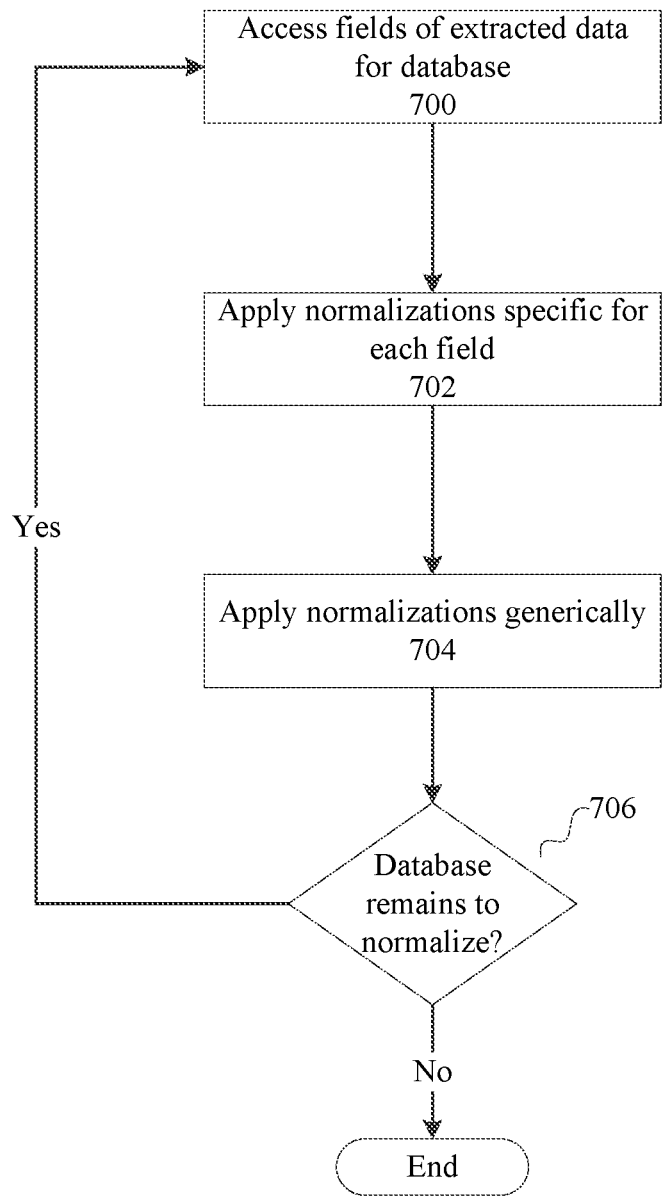
FIG. 7 is a flow chart describing an example implementation of a normalization application.

Accordingly, as shown in FIG. 7, a flowchart illustrates an example implementation of normalization of a table of data. Such normalization can be performed while data is being extracted from the first database 102 and second database 103 into their corresponding normalized tables 104, 106. The data fields to be extracted from the selected database, e.g., the first database 102, are accessed 700. For each metadata field for which there is a normalization process for that metadata field type, the normalization process for that type of metadata field is applied 702 to the values in that metadata field to generate corresponding normalized metadata fields. Other normalization rules are then generically applied 704 to the remaining fields, including the additional metadata fields generated through metadata-specific normalization. These steps are repeated to generate the normalized table of data 106 for the second database 103, as indicated 706.

An example implementation of the candidate selection application will now be described in more detail in connection with the flowchart shown in FIG. 8. In FIG. 8, a data field from the first database and a data field from the second database are selected 800 as the first index field and the second index field. A join operation is performed 802 on the extracted, normalized data tables from the first and second databases to generate a table of candidate records. The join operation can be characterized as a way of selecting, for each data record in the first database, each data record in the second database for which the value in the second index field matches the value in the first index field of the data record from the first database. There can be multiple such data records in the second database which can be a match for a given data record from the first database.

Multiple join operations can be performed by repeating steps 800 and 802, as indicated at 804, and selecting different metadata fields as the index field. If multiple such join operations are performed, a union of the resulting tables is computed 808 to provide a full list of candidates.

In a relational database management system (RDBMS), or other relational database implementation, particularly those supporting a form of Structured Query Language (SQL) or variant thereof, the inner join operation is a particular efficient way to implement the candidate lookup application to reduce the sets of data records which are compared to each other. Other database structures that can implement a join operation, such as a file-based database, such as the Hadoop database with an implementation of a join operation, can be used to similar effect. As a result of such a join operation, for each data record in the first database, that data record may be compared to a small number of candidates from the second database instead of the entire second database.

As an example in comparing databases of media data files, metadata fields that can be used as index fields include title fields, description fields and/or source entity fields, such as an artist's name or director's name fields. For movies, as an example, a combination of title (without its subtitle, due to normalization), description and director fields as normalized index fields produces a satisfactory candidate set for further analysis by a matching application.

Given the table of candidate data records resulting from the process of FIG. 8, the matching application (116 in FIG. 1) processes each data record to provide a set of scores which are added to the data record. More particularly, it should be observed that, in each row in the table of candidate records, there is normalized metadata from a data record in the first database and corresponding normalized metadata from a candidate match data record in the second database. For each type of metadata, a different matching module can be provided to compare normalized metadata of that type. Several examples of such a matching module follow. Implementation of the matching application using several matching modules allows each matching module to be tailored to a specific type of metadata present in the data records.

One kind of metadata field is a metadata field that stores name data, such as a proper name of a person, or of an organization. For media files, such names may be in metadata fields for directors, actors, studios, artists, musicians, and so on. As noted above, such metadata fields can be processed into a list of zero or more normalized names as strings of text. For a pair of such fields, one kind of score is a binary value (indicating true or false) if one of the names is one of the fields is contained in one of the names in the other of the fields. For example, this "contained in" value is true if one field has "janedoe" and the other field has "janedoesmith". Such a comparison can be implemented using a simple string operation applied to the fields. Another kind of score that can be computed is a similarity metric applied to the two strings. Any of a variety of other similarity or distance metrics can be used. For example, any edit distance metric can be used. An example distance metric that can be used is a Levenshtein distance metric. The value resulting from computing the distance metric, or a binary value resulting from a comparison of the computed distance to a threshold, or both, can be stored as a score for the pair of fields. In one implementation, both the "contained in" score and the distance metric score can be stored.

Another kind of metadata field is a metadata field that stores a year. The normalization process can result in several metadata fields storing a year. For example, a year field may exist in the data record, but also may be extracted from a studio name or title or other data in the data record. To compare the data between two databases, the matching module can compute a binary value (true or false) which can be true if the value in any one of the year fields from one database match the value in any one of the year fields from the other database.

Another kind of metadata field is a metadata field that stores a text description for an item. For media files, a database may include a significantly large text description for an item, which can contain some valuable information. There are a number of different techniques that can be used to compute a measure of similarity between two text descriptions, such as an edit distance metric. The value resulting from computing the distance metric, or a binary value resulting from a comparison of the computed distance to a threshold, can be stored as a score for the pair of fields.

As a particular example of such a similarity score computation to be applied to a text description is the following. If the two strings are equal, then the score is 1. Otherwise, the strings are compared character-by-character, incrementing a counter for each pair of matching characters, until a mismatch is identified. After a mismatch is identified, the ratio of the counter to the length of the description is computed. This ratio can be compared to a threshold to provide a binary value (true or false) indicative of a match.

For databases that are catalogs of movies, a matching module can also be provided for producing scores particularly with respect to actor information. In addition to, or as an alternative to comparing names in pairs of data fields specifying actors' names, the description field from one database can be searched for actor names listed in actor fields from the other database to generate a score. The score can be a simple count of actor names, as normalized as described above, found in the normalized text description. Such a computation is useful if one of the databases does not have actor information specified, but the other database does. In some cases, a database may include a director in an actor name field. The director name, if known, can be excluded from the count of names found in the description.

Figure 9:
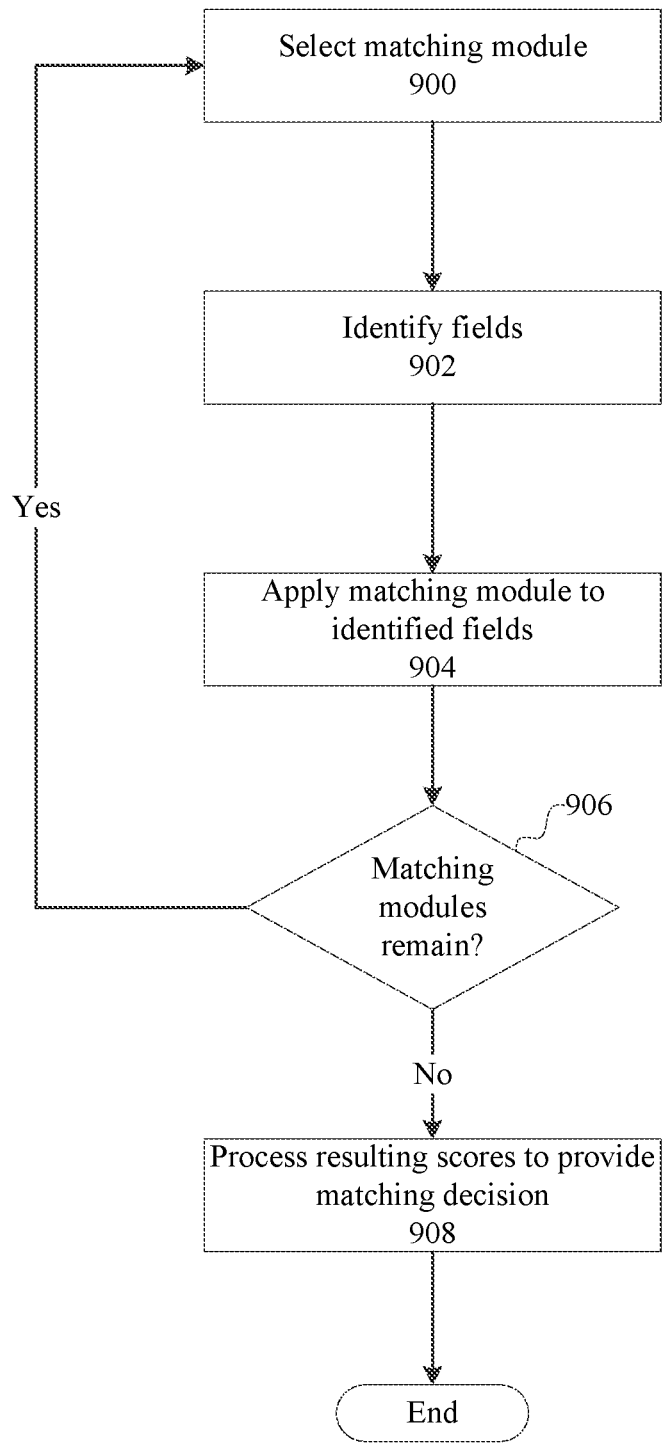
FIG. 9 is a flow chart describing an example implementation of a matching application.

The flowchart of FIG. 9 describes an example implementation of a matching application including a plurality of matching modules. The matching application selects 900 a matching module from among the plurality of matching modules and identifies 902 the corresponding one or more metadata fields derived from the first database, and the corresponding metadata fields derived from the second database, to which the matching module is to be applied. The matching module is applied 904 to each data record in the table of candidate data records, with the corresponding scores added to the data records. If there are more matching modules to be applied, as determined at 906, the process repeats. After all of the matching modules have been applied, the table of candidate records, as updated with scores, can be processed 908 (e.g., by the decision module 124 in FIG. 1) to provide a matching decision.

The decision module 124 can process the scores resulting from the matching module in a number of ways. In general, one or more rules can be applied to the scores in each data record to generate a final score indicative of whether the two items in the data record match. As one example, a set of tests can be applied to the scores which provide both a final score indicative of a match and a confidence score indicative of a confidence of the match. In general, the number of matching modules that indicate a match, and a relative priority of those matching modules, can be used to generate both the criteria for whether the final score indicates a match, and the confidence of that match.

Figure 10:
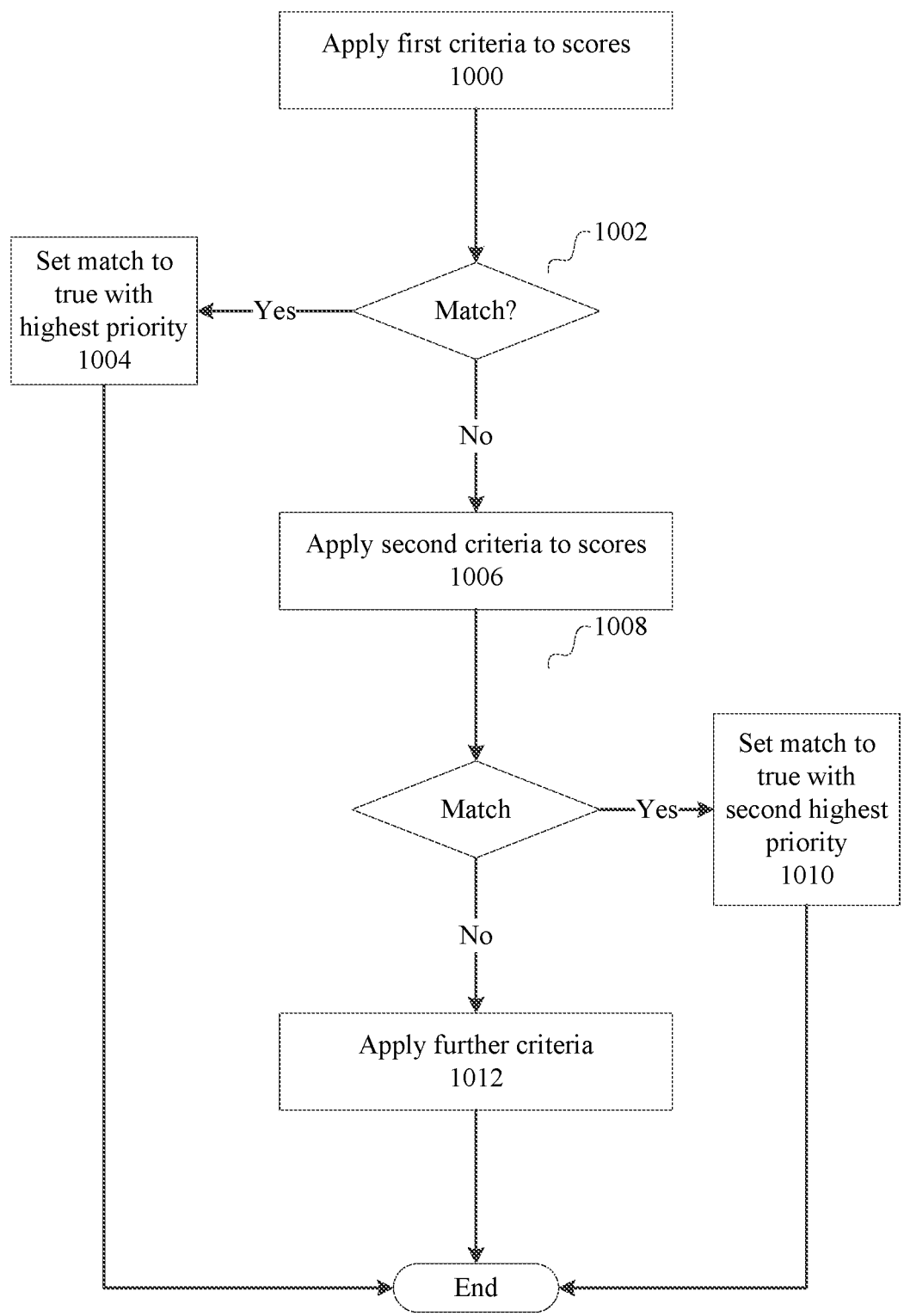
FIG. 10 is a flow chart describing an example implementation of a decision module.

As a particular example, in FIG. 10, for a given data record, first criteria can be applied 1000 to the scores. The first criteria can evaluate whether the results from selected matching modules of high priority are true. If, according to the first criteria, there is a match as indicated at 1002, then the final score for the record is set 1004 to indicate a match, and a priority score is set to a high value. Otherwise, second criteria can be applied 1006. The second criteria can consider whether values from a different selection of matching modules are true, but for which the confidence of the match is lower. If, according to the second criteria, there is a match as indicated at 1008, then the final score for the record is set 1010 to indicate a match, and a priority score is set to the second highest value. Otherwise, further criteria can be considered, as indicated at 1012. The number of further criteria can depend on the implementation.

The following example implementation uses four levels of priority. As a specific example of such criteria, for databases representing catalogs of movies, a high priority match can be indicated if the titles are equal or if the descriptions match and if any one of the following is true: the directors are equal, the directors match and the year or description match, the studio matches and the year or description match. A second priority match can be indicated if the titles match, the year matches, and either the directors or studios match. A third priority match can be indicated if the titles are equal or the descriptions match and the year matches. A fourth priority, or lowest priority, match can be indicated if the titles are equal or the descriptions match or the directors are equal and another condition is met. That other condition can be based on the number of actors found in the description and the years match. Another condition that can be considered is the number of products related to the director in the specified year. In the foregoing definitions of criteria, values are equal if they are an exact match; values match when the output score produced by the matching module is above a threshold.

After determining a final match value and a priority for each data record, any data record for which the final match value is not true can be removed from the table of candidate data records. The remaining data records indicate those candidates from the second database which have a high likelihood of being a good match to the corresponding item from the first database. However, these candidate matches may represent different versions of an item and may not be exact matches. The matching application can further apply additional computations and criteria to provide information about versions.

Determination of version information is dependent on the type of items represented by the database and information about those items. For example, with media files such as movies or music, subtitle information extracted in the normalization process can indicate version information, such as "digitally remastered" or "bonus features" and the like.

In one implementation, given the subtitle field for an item, a vector of version information can be computed based on identifying keywords in the subtitle text. A process of feature extraction applied to the subtitle field can be used to generate the version information vector. For example, each component of the version information vector can represent whether a feature is found in the subtitle field. Feature extraction generally applies a function to the data in the subtitle field to obtain a value. For example, feature extraction can include a string search for a keyword or keywords in the subtitle field Version information vectors for two items can be compared to determine an extent of similarity of the versions of this item. For each record remaining in the table of candidate data records, a vector of version information is computed for each item in the data record, providing a reference vector for one item and a candidate vector for another item.

The vector of version information can be a set of binary values (e.g., "1" representing true and "0" representing false) with each binary value representing the presence of a corresponding keyword in the subtitle. As an example, for music such a vector may include a value indicating the presence of the keyword "live" and a value indicating the presence of the keyword "remastered". For movies, such a vector may include a value for the keyword "bonus" and the keyword "director". The selection of the keywords related to versions is dependent on the type of items represented by the database. With such an implementation, this module can compute a scalar distance between the vectors of version information.

In another implementation, given the subtitle fields for the item, a form of edit distance calculation can be applied to compare the subtitle texts. For example, a Levenshtein distance can be used. The distance can be compared to a threshold to make a determination of whether the subtitles are the same, and provide a binary value indicative of such.

Such an edit distance calculation can be modified so as to improve the precision of the calculation depending on the type of item the subtitle is for. For example, with data about movies, an example implementation is the following. First, version keywords used to generate the vector of version information are removed from the subtitles. An initial score is set to zero. If the reduced subtitles are equal, then 100 is subtracted from the current score. Otherwise, if the reduced subtitle for one item is contained in the reduced subtitle for the other item, then 1 is subtracted from the current score. The Levenshtein distance between the reduced subtitles is computed and added to the current score to provide a version distance value. Either the version distance value, or the version vector distance value, or both can be combined, to provide a final version distance for each data record.

As a result of the foregoing processing by the matching application, for each candidate record remaining from the table of candidate records, the record includes an identifier of an item from the first database, an identifier of an item from the second database that is a candidate match, and three data fields indicating the quality of the match, including version information. These three data fields are a field with Boolean value (e.g., 1 or 0) indicating whether the two records are a match, a field with a match priority value, and a field with a subtitle distance value. Another pass through this table can identify the most similar product for each item from the first database, which is represented by the data record which includes that item and which is indicated as a match with its associated item from the second database, and which has the highest priority and lowest subtitle distance value from among multiple data records, if any, for that item. This pass through the table can provide an output table where each row includes an identifier of an item from the first database and an identifier of its corresponding best match item from the second database.

The information resulting from this process can be used in a number of ways. For example, for any item that does not appear in any data record in the final candidate table, such an item is in one database, but not the other database. Such information can be used to identify items to be added to one of the databases. For items that are identified as similar, other comparisons can be made between the information in the databases. For example, metadata from one database can be used to update the other database.

Figure 11:
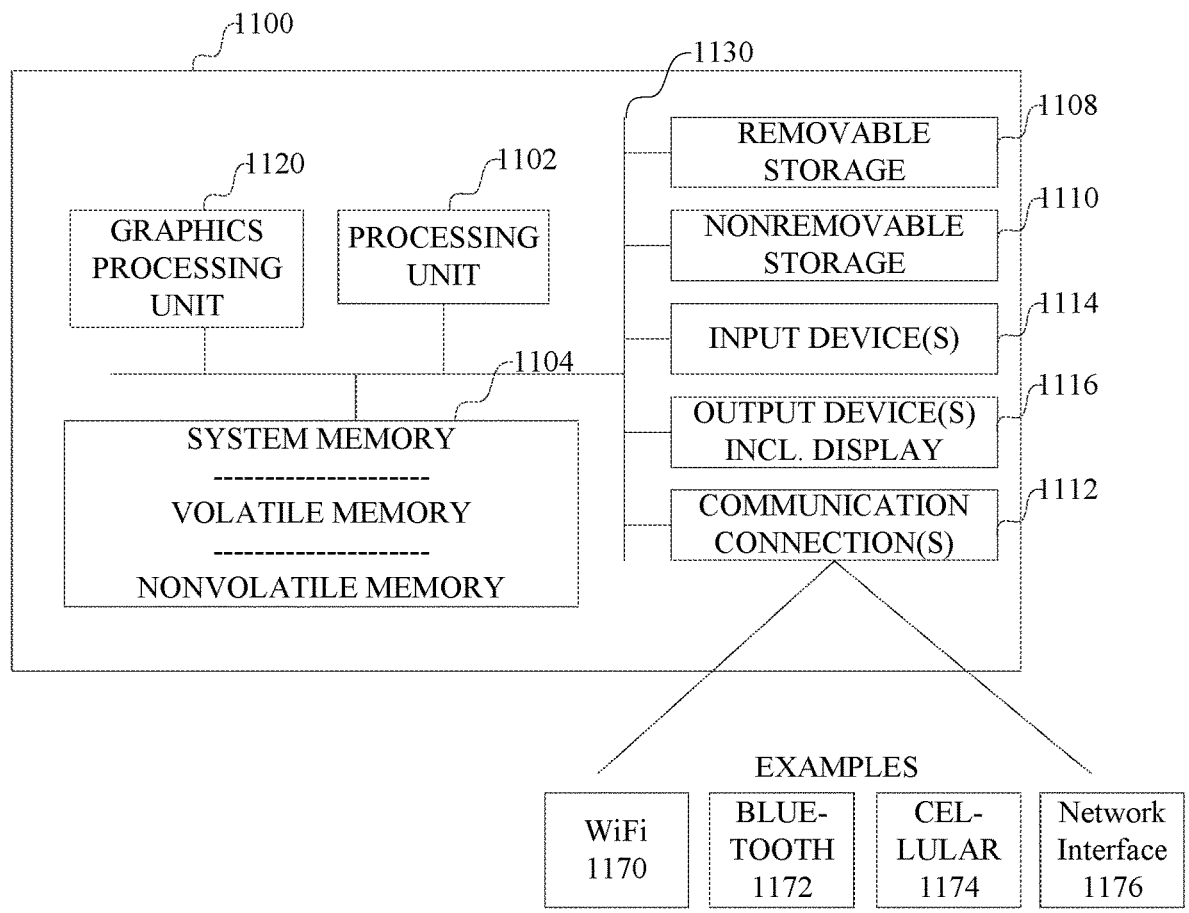
FIG. 11 is a block diagram of an example computer.

Having now described an example implementation, FIG. 11 illustrates an example of a computer with which techniques described herein can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 11, a computer 1100 includes a processing system at least one processing unit 1102 and memory 1004. The computer can have multiple processing units 1002 and multiple devices implementing the memory 1004. A processing unit 1002 comprises a processor, which is logic circuitry which responds to and processes instructions to provide the functions of the computer. A processing unit can include one or more processing cores (not shown) that are processors within the same logic circuitry that can operate independently of each other. Generally, one of the processing units in the computer is designated as a primary processing unit, typically called the central processing unit (CPU). Additional co-processing units, such as a graphics processing unit (GPU), also can be present in the computer. A co-processing unit comprises a processor that performs operations that supplement the central processing unit, such as but not limited to graphics operations and signal processing operations.

The memory 1004 may include volatile computer storage devices (such as dynamic random access memory (DRAM) or other random access memory device), and non-volatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 1000 can include additional computer storage devices (whether removable or non-removable) such as, but not limited to, magnetically-recorded or optically-recorded disks or tape. Such additional computer storage devices are illustrated in FIG. 11 by removable storage device 1008 and non-removable storage device 1010. Such computer storage devices 1008 and 1010 typically are nonvolatile storage devices. The various components in FIG. 11 are generally interconnected by an interconnection mechanism, such as one or more buses 1030.

A computer storage device is any device in which data can be stored in and retrieved from addressable physical storage locations by the computer. A computer storage device thus can be a volatile or nonvolatile memory, or a removable or non-removable storage device. Memory 1004, removable storage 1008 and non-removable storage 1010 are all examples of computer storage devices. Some examples of computer storage devices are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are mutually exclusive categories of media, and are distinct from the signals propagating over communication media.

Computer 1000 may also include communications connection(s) 1012 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 1012 are devices, such as a wired network interface, wireless network interface, radio frequency transceiver, e.g., WiFi 1070, cellular 1074, long term evolution (LTE) or Bluetooth 1072, etc., transceivers, navigation transceivers, e.g., global positioning system (GPS) or Global Navigation Satellite System (GLONASS), etc., or network interface devices 1076, e.g., Ethernet, etc., or other devices that interface with communication media to transmit data over and receive data from the communication media.

The computer 1000 may have various input device(s) 1014 such as a pointer device, keyboard, touch-based input device, pen, camera, microphone, sensors, such as accelerometers, thermometers, light sensors and the like, and so on.

The computer 1000 may have various output device(s) 1016 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 1008 and 1010, communication connections 1012, output devices 1016 and input devices 1014 can be integrated within a housing with the rest of the computer, or can be connected through various input/output interface devices on the computer, in which case the reference numbers 1008, 1010, 1012, 1014 and 1016 can indicate either the interface for connection to a device or the device itself as the case may be.

A computer generally includes an operating system, which is a computer program that manages access, by applications running on the computer, to the various resources of the computer. There may be multiple applications. The various resources include the memory, storage, input devices and output devices, such as display devices and input devices as shown in FIG. 11. To manage access to data stored in nonvolatile computer storage devices, the computer also generally includes a file system maintains files of data. A file is a named logical construct which is defined and implemented by the file system to map a name and a sequence of logical records of data to the addressable physical locations on the computer storage device. Thus, the file system hides the physical locations of data from applications running on the computer, allowing applications access data in a file using the name of the file and commands defined by the file system. A file system provides basic file operations such as creating a file, opening a file, writing a file, reading a file and closing a file.

The various modules, tools, or applications, and data structures and flowcharts of FIGS. 1 through 10, as well as any operating system, file system and applications on a computer in FIG. 11, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer system compares databases, where each data record includes values for a plurality of fields, by applying database operations on database tables of the data records to reduce computations being performed. For each data record in a reference set, candidate matches are identified from among the data records in a target set by performing a join operation on the sets on one or more selected, normalized fields from the sets. This significantly reduced set of candidate matches can be further analyzed to determine how similar they are to the data record from the reference set.

In another aspect, a computer system includes a means for selecting a candidate set based on the first database and the second database using the normalized first index field and the normalized second index field, to generate a table combining the first metadata fields and the second metadata fields, wherein the table comprises, for each data record in the first database having a similar data record in the second database, and for each similar data record, a row combining data fields for the data record from the first database with data fields for the similar data record from the second database, wherein the similar data record is a data record that has a value in the normalized second index field which matches the value in the normalized first index field for the data record in the first database.

In another aspect, a computer system includes a means for computing a reduced list of candidate data records from a second database for each data record in a first database, and to associate data from each candidate data record in the second database with data from a corresponding data record in the first database into a single record. The computer system further includes a means for computing scores based on data from an associated candidate data record of the second database and the corresponding data record from the first database, which scores are indicatively of similarity.

In another aspect, a computer system comprises computer storage, wherein a first database and a second database are stored in the computer storage. The first database comprises a first plurality of first data records. Each first data record comprises a first plurality of first data fields storing metadata describing an item from among a first plurality of items. The first plurality of data fields comprises at least a first identifier field, a first index field, and at least two more first metadata fields. Each first identifier field for each first data record for an item stores a value representing an identifier for the item in the first database. Each first index field for each first data record for an item stores a value representing a description of the item. The second database comprises a second plurality of second data records. Each second data record comprises a second plurality of second data fields storing metadata describing an item from among a second plurality of items. The second plurality of data fields comprises at least a second identifier field, a second index field, and at least two more second metadata fields. Each second identifier field for each second data record for an item stores a value representing an identifier for the item in the second database. Each second index field for each second data record for an item stores a value representing a description of the item. For similar items in the first database and the second database, the value representing the identifier for the similar item in the first identifier field may be different from the value representing the identifier for the similar item in the second identifier field.

In this computer system, in one aspect, a processing system comprises a memory and a processor. The processing system is operable to access the computer storage and is configured by computer program instructions to be operative to normalize the values in the first index field of the first data records and the values in the second index field of the second data records. A candidate set of data records is selected based on the first database and the second database using the normalized first index field and the normalized second index field, to generate a table combining the first metadata fields and the second metadata fields. This table comprises, for each data record in the first database having a similar data record in the second database, and for each similar data record, a row combining data fields for the data record from the first database with data fields for the similar data record from the second database. The similar data record is a data record that has a value in the normalized second index field which is equal to the value in the normalized first index field for the data record in the first database. For each row in the generated table, values of first metadata fields in the row are compared to values of corresponding second metadata fields in the row to generate scores. The scores can be stored as data fields in the row. For each row in the generated table, whether the data record from the second database corresponding to the row is equivalent to the data record from the first database corresponding to the row is determined based on the generated scores stored in the row.

Using such a computer system, in another aspect, a computer implemented process comprises normalizing the values in the first index field of the first data records and the values in the second index field of the second data records. The process further includes selecting a candidate set based on the first database and the second database using the normalized first index field and the normalized second index field, to generate a table combining the first metadata fields and the second metadata fields, wherein the table comprises, for each data record in the first database having a similar data record in the second database, and for each similar data record, a row combining data fields for the data record from the first database with data fields for the similar data record from the second database, wherein the similar data record is a data record that has a value in the normalized second index field which is equal to the value in the normalized first index field for the data record in the first database. The process further includes, for each row in the generated table, comparing values of first metadata fields in the row to values of corresponding second metadata fields in the row to generate scores, and storing the scores as data fields in the row. The process further includes, for each row in the generated table, determining whether the data record from the second database corresponding to the row is equivalent to the data record from the first database corresponding to the row, based on the generated scores stored in the row.

In any of the foregoing aspects, the computer system can select the candidate set by performing a join operation of the first database and the second database on the normalized first index field and the normalized second index field to generate the table.

In any of the foregoing aspects, selecting the candidate set can use a plurality of normalized first index fields and a plurality of normalized second index fields.

In any of the foregoing aspects, selecting the candidate set can include performing a first join operation of the first database and the second database on the normalized first index field and the normalized second index field to generate a first intermediate candidate table, performing a second join operation of the first database and the second database on a second normalized first index field and a second normalized second index field to generating a second intermediate candidate table, and performing a union of the first intermediate candidate table and the second intermediate candidate table to generate the table.

In any of the foregoing aspects, determining can include applying first criteria to the scores indicative of a match of a first priority, and applying second criteria to the scores indicative of a match of a second priority lower than the first priority, and storing and indication of the match and the priority of the match.

In any of the foregoing aspects, comparing values of a first metadata field to a corresponding second metadata field in a row to generate a scores can include applying an edit distance to text values stored in the first and second metadata fields.

In any of the foregoing aspects, comparing values of a first metadata field to a corresponding second metadata field in a row to generate a scores can include determining if a text value stored in the first metadata field is contained in a text value stored in the second metadata field.

In another aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer system comprising:
   computer storage, wherein a first database and a second database are stored in the computer storage,
   the first database comprising a first plurality of first data records, each first data record comprising a first plurality of first data fields storing metadata describing a first item from among a first plurality of items,
   the first plurality of the first data fields comprising at least a first identifier field and a plurality of first index fields, each first identifier field for each first data record for the first item storing a first identifier value for the first item in the first database, each first index field for each first data record for the first item storing a first description value for the first item,
   the second database comprising a second plurality of second data records, each second data record comprising a second plurality of second data fields storing metadata describing a second item from among a second plurality of items, the second plurality of the second data fields comprising at least a second identifier field and a plurality of second index fields, each second identifier field for each second data record for the second item storing a second identifier value for the second item in the second database, each second index field for each second data record for the second item storing a second description value for the second item, wherein, for one or more similar items in the first database and the second database, the first identifier value for the one or more similar items is different from the second identifier value for the one or more similar items, a processing system comprising a memory and a hardware processor, the processing system accessing the computer storage and being configured by computer program instructions to:

normalize, for each of the first data records and for each of the second data records, the first description value and the second description value; and perform a first join operation of the first database and the second database on a first set of normalized first and second description values to generate a first intermediate set of candidate matches between the first data records and the second data records;

perform a second join operation of the first database and the second database on a second set of normalized first and second description values to generate a second intermediate set of candidate matches;

perform a union of the first intermediate set of candidate matches and the second intermediate set of candidate matches to generate a set of candidate matches;

wherein, as a result of the first join operation and the second join operation, the set of candidate matches comprises, for each data record in the first database, a subset of candidate data records from the second database that is smaller than the second plurality of the second data records.

2. The computer system of claim 1, wherein the processing system is further configured to:

for each candidate match in the generated set, compare values of first metadata fields to values of corresponding second metadata fields to generate a score for the candidate match; and for each candidate match in the generated set, determine whether the second data record from the second database is equivalent to the first data record from the first database, based on the generated score for the candidate match.

3. The computer system of claim 2, wherein determining comprises applying first criteria to the generated score for each candidate match, the first criteria indicative of a first priority, applying second criteria to the generated score for each candidate match, the second criteria indicative of a second priority lower than the first priority, and storing an indication of the candidate match and a respective priority of the candidate match.

4. The computer system of claim 2, wherein comparing values of first metadata fields to values of corresponding second metadata fields to generate the score comprises applying an edit distance to text values stored in the first and second metadata fields.

5. The computer system of claim 4, wherein comparing the first metadata field to the corresponding second metadata field to generate the score comprises determining that a text value stored in the first metadata field is contained in the second metadata field.

6. An article of manufacture comprising:

a computer storage device, computer program instructions stored on the computer storage which, when processed by a computer, configures the computer to be comprising:

computer storage, wherein a first database and a second database are stored in the computer storage, the first database comprising a first plurality of first data records, each first data record comprising a first plurality of first data fields storing metadata describing a first item from among a first plurality of items, the first plurality of the first data fields comprising at least a first identifier field and a plurality of first index fields, each first identifier field for each first data record for the first item storing a first identifier value for the first item in the first database, each first index field for each first data record for the first item storing a first description value for the first item, the second database comprising a second plurality of second data records, each second data record comprising a second plurality of second data fields storing metadata describing a second item from among a second plurality of items, the second plurality of the second data fields comprising at least a second identifier field and a plurality of second index fields, each second identifier field for each second data record for the second item storing a second identifier value for the second item in the second database, each second index field for each second data record for the second item storing a second description value for the second item, a processing system comprising a memory and a hardware processor, the processing system accessing the computer storage and being configured by computer program instructions to:

normalize, for each of the first data records and for each of the second data records, the first description value and the second description value; and perform a first join operation of the first database and the second database on a first set of normalized first and second description values to generate a first intermediate set of candidate matches between the first data records and the second data records;

perform a second join operation of the first database and the second database on a second set of normalized first and second description values to generate a second intermediate set of candidate matches;

perform a union of the first intermediate set of candidate matches and the second intermediate set of candidate matches to generate a set of candidate matches;

wherein, as a result of the first join operation and the second join operation, the set of candidate matches comprises, for each data record in the first database, a subset of candidate data records from the second database that is smaller than the second plurality of the second data records.

7. The article of manufacture of claim 6, wherein the processing system is further configured to:

for each candidate match in the generated set, compare values of first metadata fields to values of corresponding second metadata fields to generate a score for the candidate match; and for each candidate match in the generated set, determine whether the second data record from the second database is equivalent to the first data record from the first database, based on the generated score for the candidate match.

8. The article of manufacture of claim 6, wherein generating the set of candidate matches comprises using a plurality of normalized first index fields and a plurality of normalized second index fields.

9. The article of manufacture of claim 7, wherein determining comprises applying first criteria to the generated score for each candidate match, the first criteria indicative of a first priority, applying second criteria to the generated score for each candidate match, the second criteria indicative of a second priority lower than the first priority, and storing an indication of the candidate match and a respective priority of the match.

10. The article of manufacture of claim 7, wherein comparing values of first metadata fields to values of corresponding second metadata fields to generate the score comprises applying an edit distance to text values stored in the first and second metadata fields.

11. The article of manufacture of claim 7, wherein comparing the first metadata field to the corresponding second metadata field to generate the score comprises determining that a text value stored in the first metadata field is contained in the second metadata field.

12. A computer-implemented process performed by a computer program executing on a computer, the computer including computer storage, wherein a first database and a second database are stored in the computer storage, the first database comprising a first plurality of first data records, each first data record comprising a first plurality of first data fields storing metadata describing a first item from among a first plurality of items, the first plurality of the first data fields comprising at least a first identifier field and a plurality of first index fields, each first identifier field for each first data record for the first item storing a first identifier value for the first item in the first database, each first index field for each first data record for the first item storing a first description value for the first item, the second database comprising a second plurality of second data records, each second data record comprising a second plurality of second data fields storing metadata describing a second item from among a second plurality of items, the second plurality of the second data fields comprising at least a second identifier field and a plurality of second index fields, each second identifier field for each second data record for the second item storing a second identifier value for the second item in the second database, each second index field for each second data record for the second item storing a second description value for the second item, the computer further including a processing system comprising a memory and a hardware processor, the processing system accessing the computer storage and being configured by computer program instructions to perform a process comprising:

normalizing, for each of the first data records and for each of the second data records, the first description value and the second description value; and performing a first join operation of the first database and the second database on a first set of normalized first and second description values to generate a first intermediate set of candidate matches between the first data records and the second data records;

performing a second join operation of the first database and the second database on a second set of normalized first and second description values to generate a second intermediate set of candidate matches;

performing a union of the first intermediate set of candidate matches and the second intermediate set of candidate matches to generate a set of candidate matches;

wherein, as a result of the first join operation and the second join operation, the set of candidate matches comprises, for each data record in the first database, a subset of candidate data records from the second database that is smaller than the second plurality of the second data records.

13. The computer-implemented process of claim 12, wherein the processing system is further configured to:

for each candidate match in the generated set, compare values of first metadata fields to values of corresponding second metadata fields to generate a score for the candidate match; and for each candidate match in the generated set, determine whether the second data record from the second database is equivalent to the first data record from the first database, based on the generated score for the candidate match.

14. The computer-implemented process of claim 12, wherein generating the set of candidate matches comprises using a plurality of normalized first index fields and a plurality of normalized second index fields.

15. The computer-implemented process of claim 13, wherein determining comprises applying first criteria to the generated score for each candidate match, the first criteria indicative of a first priority, applying second criteria to the generated score for each candidate match, the second criteria indicative of a second priority lower than the first priority, and storing an indication of the candidate match and a respective priority of the candidate match.

16. The computer-implemented process of claim 13, wherein comparing the first metadata field to the corresponding second metadata field comprises applying an edit distance to text values stored in the first metadata field and the second metadata field.

* * * * *